US005477280A

United States Patent [19]

Ko

[11] Patent Number: 5,477,280
[45] Date of Patent: Dec. 19, 1995

[54] LIQUID CRYSTAL PROJECTOR HAVING A VIDEO MONITOR

[75] Inventor: Han-il Ko, Suwon, Rep. of Korea

[73] Assignee: Samsung Electronics Co., Ltd., Kyungi-do, Rep. of Korea

[21] Appl. No.: 257,822

[22] Filed: Jun. 9, 1994

[30] Foreign Application Priority Data

Jun. 11, 1993 [KR] Rep. of Korea ............... 9310645

[51] Int. Cl.⁶ ..................................... H04N 9/31
[52] U.S. Cl. ............... 348/744; 348/180; 348/751; 348/750; 348/840; 359/449
[58] Field of Search .................... 348/744, 750, 348/751, 756, 757, 758, 759, 761, 766, 790, 840, 844, 180, 190, 191; 359/449, 460; H04N 9/31, 5/74

[56] References Cited

U.S. PATENT DOCUMENTS 5,267,029 11/1993 Kurematsu et al. .................. 348/751

Primary Examiner—Victor R. Kostak
Assistant Examiner—Nathan J. Flynn
Attorney, Agent, or Firm—Sughrue, Mion, Zinn, Macpeak & Seas

[57] ABSTRACT

A liquid crystal projector has a video monitor for displaying the same image as that displayed on a screen. The video monitor uses an amount of the light which is not displayed on the front screen according to the light transmission characteristic of a dichroic mirror, to thereby enable a user to view the same image as that displayed on the front screen through a projection lens.

5 Claims, 2 Drawing Sheets

LIQUID CRYSTAL PROJECTOR HAVING A VIDEO MONITOR

BACKGROUND OF THE INVENTION

The present invention relates to a liquid crystal projector having a video monitor, and particularly to a liquid crystal projector having a video monitor in which an image projected from the liquid crystal projector and displayed on a screen located in front of the liquid crystal projector can be viewed through another screen installed in the liquid crystal projector.

In the liquid crystal projector, dichroic mirrors separate white light projected from a light source into blue, green and red light, and a liquid crystal panel applies an electrical video signal to the color light obtained through the color separation. The color light to which the video signal is applied is projected by a projection lens so as to be displayed on a screen as an image of which the focus is adjusted. The dichroic mirrors require the characteristics in which the respective color light which is reflected or transmitted among the blue, green and red light can be completely reflected or transmitted, in order to provide a light image of a high quality. However, the dichroic mirrors used for the color separation in the liquid crystal projector do not generally full-reflect or completely transmit incident light. Thus, such dichroic mirrors reflect about ten percent of the color light in a transmission band, and also transmit about ten percent of the color light in the reflection band according to the transmission and reflection characteristic.

SUMMARY OF THE INVENTION

Therefore, based on the above characteristics of the dichroic mirrors, it is an object of the present invention to provide a liquid crystal projector having a video monitor in which a user can view the same image as that projected by a projection lens and displayed on a screen located in front of the liquid crystal projector, through another screen, by using light lost according to the light transmission characteristic of a dichroic mirror.

To accomplish the above object of the present invention, there is provided a liquid crystal projector having a means for color-separating white light projected from a light source into color light, a liquid crystal panel for applying a video signal to the color light obtained through the color separation, and a projection lens for adjusting a focus of the color light to which the video signal is applied so as to be projected on a screen, the liquid crystal projector comprising:

dichroic mirror means which receives the color light to which the video signal is applied and supplies a part of the respectively incident color light to the projection lens and through light transmission or light reflection; and a monitor which receives the other part of the respective color light which is not incident to the dichroic mirror means and displays the received color light as an image.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

A preferred embodiment of the present invention will be described below in more detail with reference to the accompanying drawings.

Figure 1:
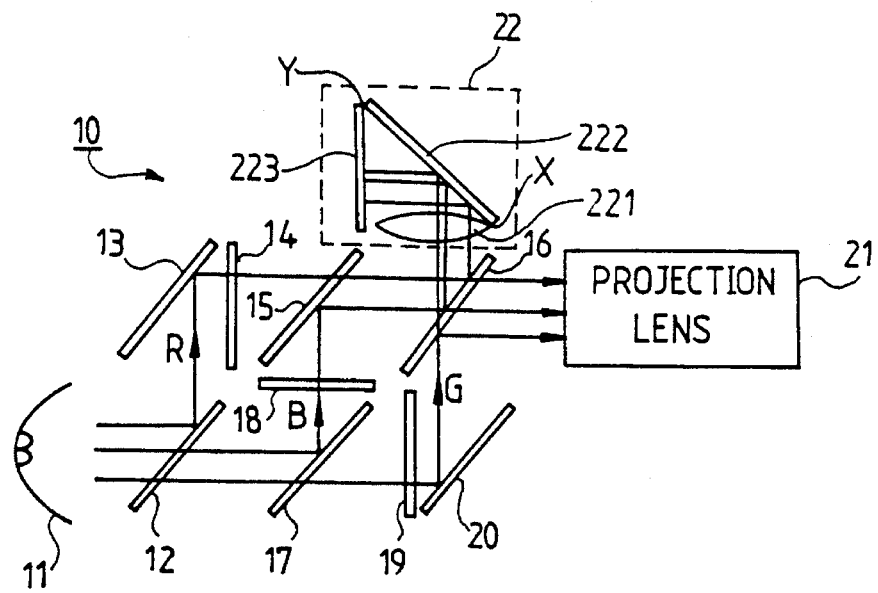
FIG. 1 is a view showing the construction of a liquid crystal projector according to one embodiment of the present invention.

FIG. 1 is a view showing the construction of a liquid crystal projector 10 having a video monitor 22 according to one embodiment of the present invention. The liquid crystal projector 10 according to the embodiment of the present invention includes a light source lamp 11, dichroic mirrors 12, 15, 16 and 17 having a light transmission characteristic different from each other according to the wavelength or the frequency of the incident light, liquid crystal panels 14, 18 and 19 for applying red, green and blue video signals to the light projected from light source lamp 11, and reflection mirrors 13 and 20 for altering the light paths. The liquid crystal projector 10 further includes a projection lens 21 for projecting the color image produced by liquid crystal panels 14, 18 and 19 onto a screen (not shown), and a video monitor 22 for displaying an image which is formed of the light which does not proceed to projection lens 21 according to the light transmission characteristic of the dichroic mirror.

Among the dichroic mirrors, a first dichroic mirror 12 and a third dichroic mirror 17 are installed consecutively in front of light source lamp 11. A second dichroic mirror 15 is disposed so as to reflect the reflection light of third dichroic mirror 17 again. A fourth dichroic mirror 16 is located between second dichroic mirror 15 and projection lens 21 so as to receive the light reflected and transmitted from second dichroic mirror 15 and applied to projection lens 21. Reflection mirror 13 alters the light path of the reflection light from first dichroic mirror 12 so as to proceed to second dichroic mirror 15. Reflection mirror 20 alters the light path of the transmission light from third dichroic mirror 17 so as to proceed to fourth dichroic mirror 16.

Dichroic mirrors 12, 15, 16 and 17 have respectively different light transmission characteristics with respect to the incident light. The respective light transmission characteristics of the dichroic mirrors are as follows. First, the first dichroic mirror 12 reflects the red light and transmits the other color light. Second dichroic mirror 15 and third dichroic mirror 17 reflect only the blue light. Fourth dichroic mirror 16 reflects only the green light.

The video monitor 22 includes an image focusing lens 221 for adjusting the focus of the light incident from fourth dichroic mirror 16, a reflection mirror 222 installed in an inclined direction of 45 degrees with respect to the lens surface of image focusing lens 221, and an image focusing element 223 for displaying the light reflected by reflection mirror 222 as an image thereon. The image focusing element 223 is composed of acril or opaque glass in which generally used diffusion material is mixed. In FIG. 1, a portion X, where image focusing lens 221 of video monitor 22 and reflection mirror 222 are contacted with each other, and a portion Y, where image focusing element 223 and reflection mirror 222 are contacted with each other, are formed so that video monitor 22 can be folded and unfolded.

If the white light is emitted by light source lamp 11, red light R separated by first dichroic mirror 12 is reflected by reflection mirror 13, and then passes through first liquid crystal panel 15 located between reflection mirror 13 and second dichroic mirror 15. First liquid crystal panel 14 modulates the light intensity of transmitted red light R according to the applied electrical signal. Thus, red video information is loaded into the red light according to a magnitude of the electrical signal. The red light R, to which the red video information is applied by the light intensity modulation, is transmitted through the second dichroic mirror 15 to proceed to fourth dichroic mirror 16. Third dichroic mirror 17 reflects blue light B and transmits green light G, among the color light incident from first dichroic mirror 12. The blue light B reflected by third dichroic mirror 17 is incident to second liquid crystal panel 18 located on the light path between third dichroic mirror 17 and second dichroic mirror 15. The blue light B, to which blue video information is applied by the second liquid crystal panel 18, is reflected by second dichroic mirror 15 to proceed to fourth dichroic mirror 16. Green video information is applied to the green light G, which is transmitted through third dichroic mirror 17, by third liquid crystal panel 19 located between third dichroic mirror 17 and reflection mirror 20. The green light G, which is transmitted through third liquid crystal panel 19, is reflected by reflection mirror 20 to proceed to fourth dichroic mirror 16. Fourth dichroic mirror 16 transmits and reflects the incident light from second dichroic mirror 15 and reflection mirror 20 to be supplied to projection lens 21.

Figure 2A:
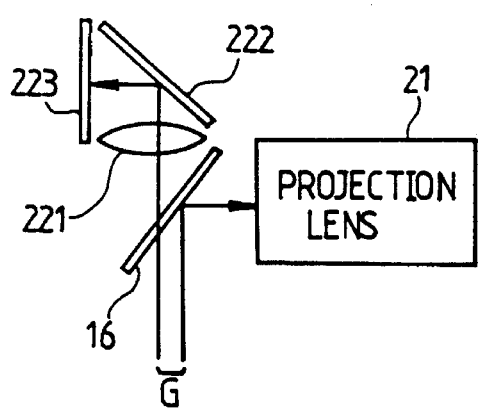
FIGS. 2A through 2C are views showing separation of the color light by a fourth dichroic mirror.
Figure 2B:
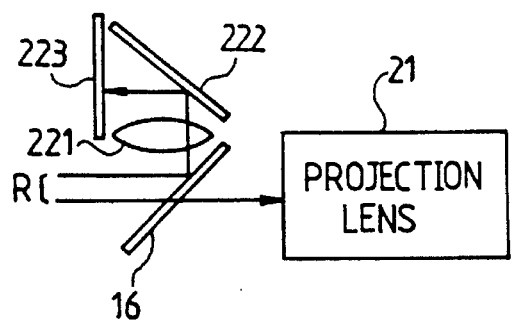
Figure 2C:
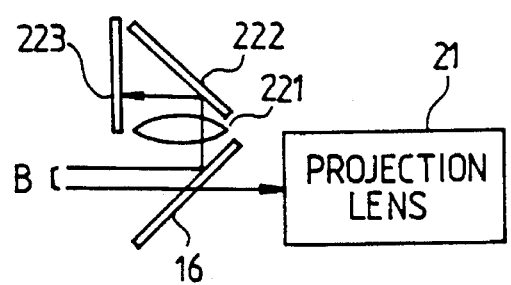

FIGS. 2A through 2C show that the respective color light is transmitted and reflected according to the light transmission characteristic of the fourth dichroic mirror 16. As described above, fourth dichroic mirror 16 does not fully transmit or reflect the incident light with respect to the transmission band or the reflection band according to the actual light transmission characteristic. Thus, fourth dichroic mirror 16 transmits a part of the color light which is incident from reflection mirror 20, and reflects a part of each color light incident from second dichroic mirror 15.

Video monitor 22 receives the color light incident from fourth dichroic mirror 16 to change the received color light into an image which a user can view. Firstly, image focusing lens 221 has a predetermined focus length so as to function for exactly focusing the color light applied from fourth dichroic mirror 16 on the surface of image focusing lens 221. The user can view the image displayed on the front screen of liquid crystal projector 10 by looking at the image focusing lens 221. However, the user may not see the image according to the angle of viewing with respect to image focusing lens 221. Thus, by installing image focusing element 223 of which the position is determined according to the focus length of image focusing lens 221, the user can view the image displayed on liquid crystal projector 10 irrespective of the angle of viewing with respect to the video monitor or the image focusing lens through image focusing element 223. Since reflection mirror 222 is installed between image focusing lens 221 and image focusing element 223, as shown in FIG. 1, the user can view the displayed image even at the back of the liquid crystal projector.

Figure 3A:
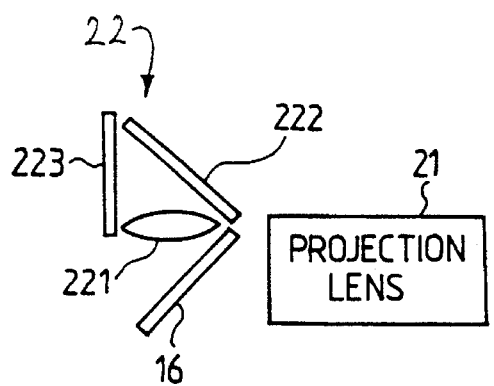
FIGS. 3A through 3D are views for explaining the structure operative for folding the video monitor.
Figure 3B:
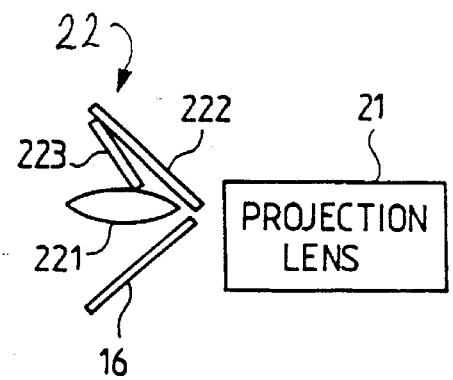
Figure 3C:
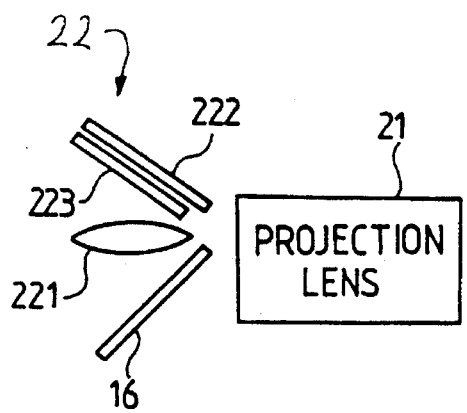
Figure 3D:
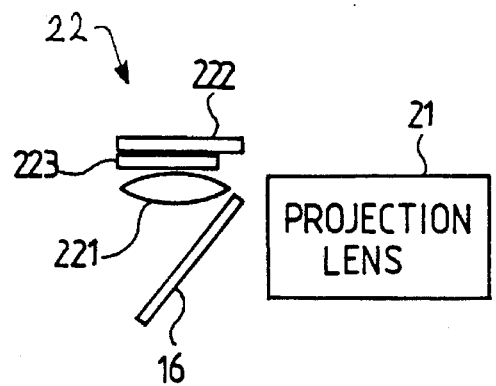

FIGS. 3A through 3D show the folding procedure of the structure of the video monitor capable of being folded. When the user watches the video monitor at the side or rear end of the liquid crystal projector, video monitor 22 has a shape shown in FIG. 3A. FIG. 3D shows a state where image focusing lens 221, image focusing element 223, and reflection mirror 222 are completely folded through procedures shown in FIGS. 3B and 3C, that is, a shape of video monitor 22 when it is not in use. In other words, the user who uses video monitor 22 can fold it when he does not want to use it, in a sequence shown in FIG. 3A to FIG. 3D. On the contrary, the user can unfold video monitor 22 in the sequence shown in FIG. 3D to FIG. 3A.

The above-described embodiment of the video monitor is constituted so that the user can view it at the back of the liquid crystal projector. However, by making the video monitor rotatable with respect to the center axis of the image focusing lens, it is possible to make a variation in which the user can view the video monitor in any direction around the liquid crystal projector. Further, by providing a hole in a position of the image focusing lens of the liquid crystal projector, it is possible for the user to directly view the same image as that displayed on the front screen of the liquid crystal projector through the fourth dichroic mirror.

As described above, the present invention displays the image on the front screen of the liquid crystal projector by the light transmission characteristic of the dichroic mirror. For this purpose, the present invention disposes the video monitor capable of displaying the same image as that displayed on the screen through the projection lens within the liquid crystal projector, in order to use an amount of the lost light which is not used. Accordingly, the user who manipulates the liquid crystal projector can view the image which is displayed on the screen without watching the screen installed in front of the liquid crystal projector.

It is contemplated that numerous modifications may be made to the liquid crystal projector of the present invention without departing from the spirit and scope of the invention as defined in the following claims.

What is claimed is:

1. A liquid crystal projector comprising a means for color-separating white light projected from a light source into color light, a liquid crystal panel for applying a video signal to the color light obtained through the color separation, and a projection lens for adjusting a focus of the color light to which the video signal is applied so as to be projected on a screen, said liquid crystal projector further comprising:

dichroic mirror means which receives the color light to which the video signal is applied and supplies a first part of the respective color light to the projection lens through light transmission or light reflection; and a monitor which receives a second part of the respective color light received by the dichroic mirror means as a received colorlight and displays the received color light as an image.

2. The liquid crystal projector according to claim 1, wherein said monitor comprises an image focusing lens for adjusting a focus of the color light incident from said dichroic mirror means.

3. The liquid crystal projector according to claim 2, wherein said monitor further comprises a reflection mirror for reflecting the color light which is transmitted through said image focusing lens at a predetermined angle.

4. The liquid crystal projector according to claim 3, wherein said monitor further comprises an image focusing element for displaying the color light reflected by said reflection mirror as an image.

5. The liquid crystal projector according to claim 4, wherein said image focusing lens, said reflection mirror and said image focusing element are operative to be folded over each other when not in use.

* * * * *